Figures 1, 2:
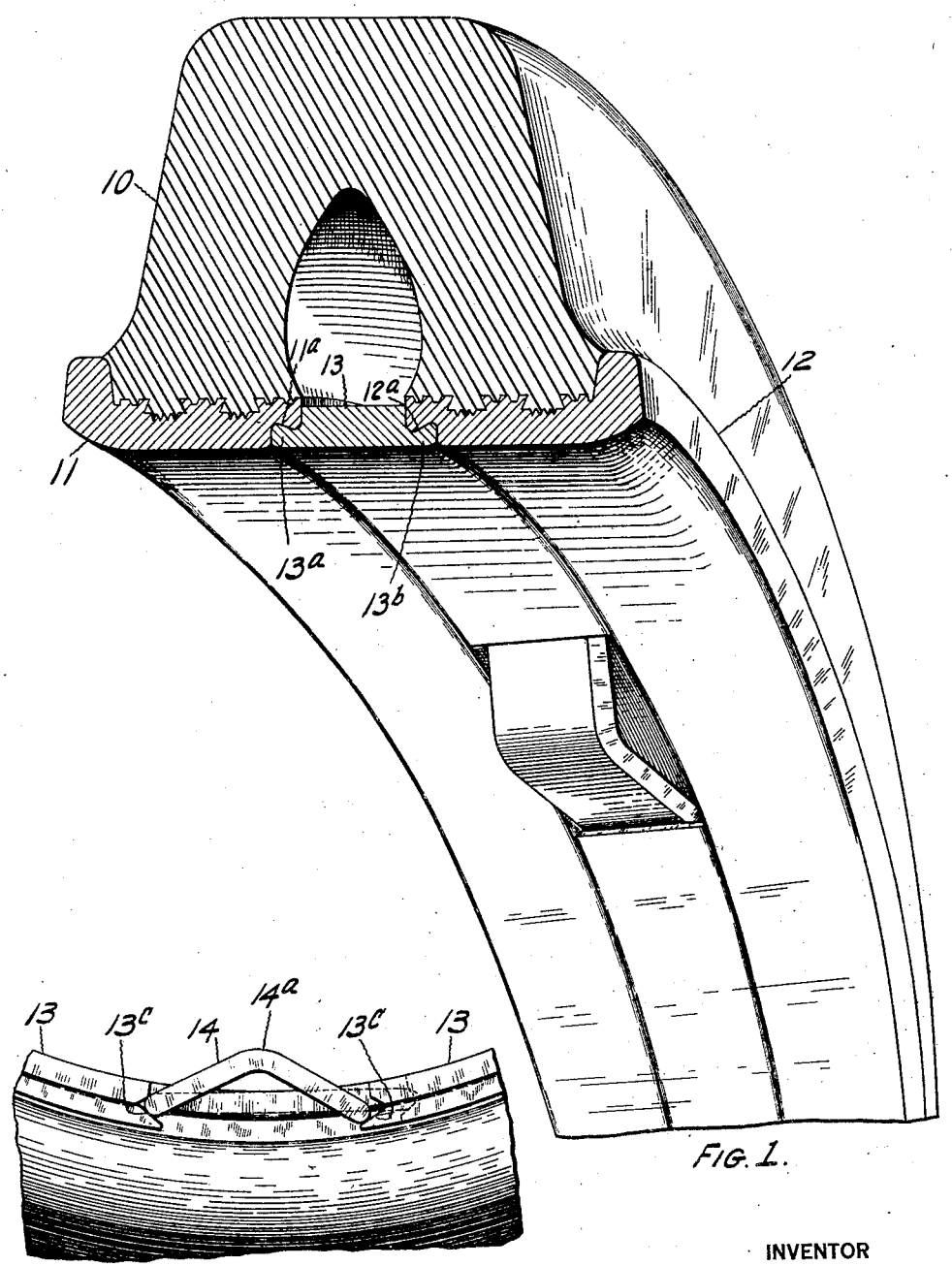

May 15, 1928.  
E. CLARK  
BASE BAND FOR CUSHION TIRES  
Filed Jan. 26, 1923

1,669,600

INVENTOR  
ELMER CLARK  
BY *R. D. Trogner*  
ATTORNEY

Patented May 15, 1928.

1,669,600

UNITED STATES PATENT OFFICE.

ELMER CLARK, OF AKRON, OHIO, ASSIGNOR TO THE GOODYEAR TIRE & RUBBER COMPANY, OF AKRON, OHIO, A CORPORATION OF OHIO.

BASE BAND FOR CUSHION TIRES.

Application filed January 26, 1923. Serial No. 615,057.

My invention relates to base bands for vehicle tires having a rubber cushion body of arched cross section, the two bases of which are vulcanized to a pair of endless metal base members. The metal base members are spaced and locked together by means of an interposed spacing member.

The base-bands for tires of this general type have heretofore been provided with interposed spacer rings that depend upon their inherent resiliency and snug fit to maintain them in place. Such rings have flanges along both edges that interlock with complementary flanges on the base members to prevent lateral separation thereof. Tires of this class are usually pressed onto a wheel having an outer rim of slightly larger diameter than the inside diameter of the base members and the tire is held in place on the wheel solely by the frictional engagement of the base members with the rim of the wheel.

During the operation of tires of this type, enormous forces are developed which tend to separate the base members and very often the interlocking of the side flanges and complemental grooves of the base members with the loose fitting spacing ring previously employed is insufficient to hold the parts together.

My invention contemplates a means of locking the spacer ring with the base members so as to preclude any separation of the parts.

Fig. 1 of the accompanying drawings is a perspective view, shown partially in section, of a portion of a tire embodying a base-band constructed in accordance with my invention; and Fig. 2 is a fragmentary side elevational view, with the base member nearest the observer removed to show the side view of the spacer ring and its application to the remaining base member.

The vehicle cushion tire shown in the drawings comprises a resilient body 10 of arched cross section having its two legs permanently vulcanized to endless metal base members 11 and 12. The base members are locked together in spaced relation by a transversely split ring 13 that has a pair of flanges 13$^a$ and 13$^b$ along its edges that respectively interlock with complementary flanges 11$^a$ and 12$^a$ of the respective side members.

My invention consists, in general, in locking the ring 13 in place by means of a deformable metal strut 14 that is interposed between the spaced ends of the ring 13. Each end of the ring 13 is notched as shown in Fig. 2 to receive and retain the corresponding end of the strut 14. The radially outer side of each end of the ring 13 is extended to form a ledge or lip 13$^c$ for supporting the corresponding end of the strut 14 during the deforming thereof.

The operation of my device is substantially as follows: After the ring 13 is sprung in place in accordance with conventional practice, the metal strap or strut 14 is positioned as shown in Fig. 2. By beating upon the knee 14$^a$ of the strut, its ends are forced apart by the straightening of the knee. This causes the ring to expand and seat itself firmly on the lips 11$^a$ and 12$^a$ of the base members. If the ring 13 is expanded only by its inherent resiliency, it cannot seat itself securely and the base members invariably become separated under extreme service conditions. The positive expansion of the ring 13 by means of the strut 14 firmly locks the parts together so that separation of the parts does not result, even under the most unfavorable of service conditions. The strut 14 may be of such length that the knee may be driven completely below the inner surface of the base members to thus avoid any interference with the mounting of the tire on a wheel.

After the tire and base-band is assembled as above set forth, it is mounted on a wheel in the conventional manner by being forced laterally onto a felloe-band where it is maintained by frictional engagement with the band.

Although I have described a particular design of tire embodying separated base members and an interposed locking ring, my invention is not necessarily limited to application with this tire since it can obviously be applied to any tire embodying these elements. I therefore desire that only such limitations shall be imposed as are set forth in the appended claims.

What I claim is:

1. A base band comprising a pair of endless metal base members, a transversely split ring interposed between said base members and interlocked therewith, the ends of said ring being spaced, and an arched metal member adapted to be interposed between the ends of said ring and subsequently deformed in such manner as to expand the ring.

2. A base band comprising a plurality of endless base-band elements, a transversely split locking ring adapted to secure said base-band elements together, and means interposed between the ends of said locking ring adapted to be deformed to secure said locking ring in place.

In witness whereof, I have hereunto signed my name.

ELMER CLARK.